(12) United States Patent
Godefroid

(10) Patent No.: US 6,178,394 B1
(45) Date of Patent: Jan. 23, 2001

(54) PROTOCOL CHECKING FOR CONCURRENT SYSTEMS

(75) Inventor: Patrice Ismael Godefroid, Naperville, IL (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 08/762,564

(22) Filed: Dec. 9, 1996

(51) Int. Cl.$^7$ ................................................. G05B 19/045
(52) U.S. Cl. ................................. 703/17; 703/22; 714/39
(58) Field of Search ................................. 703/13, 21, 22, 703/17, 27; 714/1, 25, 37, 38, 39

(56) References Cited

U.S. PATENT DOCUMENTS

| | | | |
|---|---|---|---|
| 4,754,400 | * 6/1988 | Wakahara et al. | 714/1 |
| 5,163,016 | * 11/1992 | Har'El et al. | 395/500.06 |
| 5,615,137 | * 3/1997 | Holzmann et al. | 395/500.38 |
| 5,768,498 | * 6/1998 | Boigelot et al. | 714/39 |

OTHER PUBLICATIONS

Godefroid, P. et al., "A Partial Approach to Model Checking," Proc. of 6th Annual IEEE Symp. on Logic in Computer Science, Jul. 1991, pp. 406–415.*

Partial–Order Methods for the Verification of Concurrent Systems—An Approach to the State–Explosion Problem, vol. 1032 of Lecture Notes in Computer Science, Springer–Verlag (Jan. 1996).

Using Partial Orders to Improve Automatic Verification Methods, published in Proc. 2nd Workshop on Computer Aided Verification, vol. 531 of Lecture Notes in Computer Science, p. 176–185, Rutgers, Springer–Verlag (Jun. 1990).

Using Partial Orders for the Efficient Verification of Deadlock Freedom and Safety Properties, published in Formal Methods in System Design, 2(2):149–164 (Apr. 1993).

* cited by examiner

*Primary Examiner*—Kevin J. Teska
*Assistant Examiner*—Kyle J. Choi
(74) *Attorney, Agent, or Firm*—Eugene J. Rosenthal

(57) ABSTRACT

A verification of the protocol between the various communicating elements of a concurrent system may be performed directly using the actual code that implements the element when it is actually operating. This is achieved by combining stateless search techniques with partial order methods, namely, persistent set and sleep set methods. In particular, the code of each element of a system is exercised by a scheduler in such a way that global states of the system are visited according to a stateless search, which is a search that does not use an explicit representation of the global states. A global state is a state in which the next operation to be executed by every element of the system is a visible operation. The set of visible operations includes at least those operations related to communication between the elements. The global states are visited using an intelligent state space exploration technique so that only a selected subset of all the global states are visited while ensuring that those global states that are not visited need not be visited to verify the existence or absence of selected problems that might exist in the protocol. Such selected properties can include the existence of 1) deadlocks, 2) assertion violations, 3) divergences, and 4) livelocks. Advantageously, complex protocols in systems having many elements may be efficiently verified, while using prior art comprehensive search techniques could not verify even a simplistic toy protocol within a reasonable amount of time.

19 Claims, 2 Drawing Sheets

(3) DEADLOCKS ARE DETECTED

PROTOCOL CHECKING FOR CONCURRENT SYSTEMS

TECHNICAL FIELD

This invention relates to the verification of communication protocols used in concurrent systems.

BACKGROUND OF THE INVENTION

Prior art verification of protocols used in concurrent systems required a model, such as a finite state machine or an extended finite state machine, to be developed for each communicating element in the concurrent system. The verification of the protocol between the various communicating elements was then performed on the model. However, verification could not be performed using the actual code, for example C code or C++ code, which implemented the element and described entirely its behavior when the element was actually operating. This is disadvantageous because a) it is time consuming to develop the model and b) the verification is only as good as the accuracy of the model.

SUMMARY OF THE INVENTION

In accordance with the principles of the invention, the verification of the protocol between the various communicating elements of a concurrent system may be performed directly using the actual code that implements the element when it is actually operating. This is achieved by combining stateless search techniques with partial order methods, namely, persistent set and sleep set methods. In particular, the code of each element of a system is exercised by a scheduler in such a way that global states of the system are visited according to a stateless search, which is a search that does not use an explicit representation of the global states. A global state is a state in which the next operation to be executed by every element of the system is a visible operation. The set of visible operations includes at least those operations related to communication between the elements. The global states are visited using an intelligent state space exploration technique so that only a selected subset of all the global states are visited while ensuring that those global states that are not visited need not be visited to verify the existence or absence of selected problems that might exist in the protocol. Such selected properties can include the existence of 1) deadlocks, 2) assertion violations, 3) divergences, and 4) livelocks. Advantageously, complex protocols in systems having many elements may be efficiently verified, while using prior art comprehensive search techniques could not verify even a simplistic toy protocol within a reasonable amount of time.

DETAILED DESCRIPTION

Figure 1:
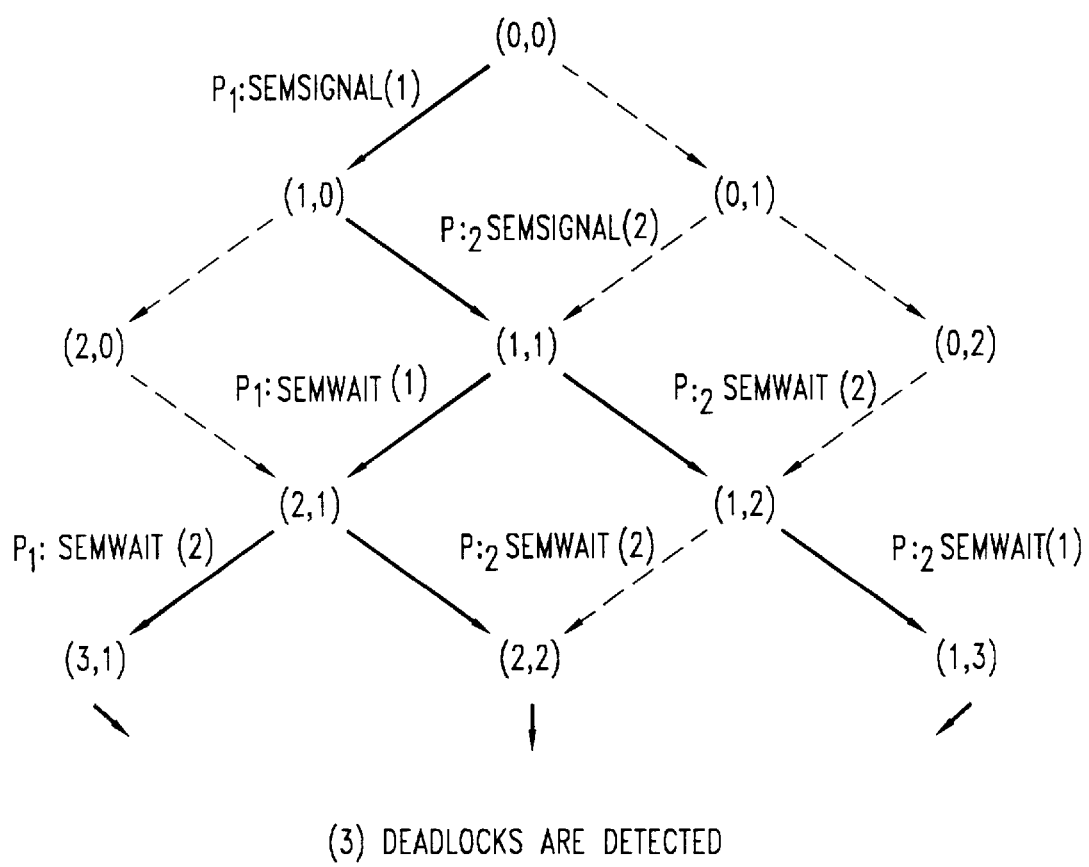
FIG. 1 shows the state space $A_G$ of a system where global transitions are labeled with the visible operation of the corresponding process transition.

A concurrent system is a system composed of two or more components that can operate concurrently and communicate with each other. Each component can itself be viewed as a reactive system, i.e., a system that continuously interacts with its enviromnent. Concurrent reactive systems are notably hard to design because their components may interact in many unexpected ways. Also, traditional testing techniques are of very limited help since test coverage is bound to be only a minute fraction of the possible behaviors of the system.

State-space exploration is one of the most successful strategies for analyzing the correctness of a concurrent reactive system. A major aspect of the strategy is the exploration of a directed graph, the so-called "state space", which represents the combined behavior of all concurrent components in the system. Such a state space can be computed automatically from a description of the concurrent system specified in a modeling language. Many properties of a system such as deadlocks, dead code, violations of user-specified assertions, etc., can be checked by exploring its state space. Moreover, the range of properties that state-space exploration techniques can verify has been substantially broadened due to the development of model-checking methods for various temporal logics.

Herein "model checking" in broadly used, to denote any automatic state-space exploration technique that can be used for verification purposes. Note that "model checking" is not due to the fact that the correctness of a model, i.e., abstraction, of a system is checked, but rather it refers to the fact that model checking checks whether all the computations of a system are "models", in the classical logical sense, of a temporal logic formula.

As an example, consider a concurrent system composed of a finite set P of processes and a finite set O of communication objects. Each process P executes a sequence of operations, that is described in a sequential program written in a real-life programming language, such as C or C++. Such programs are deterministic: every execution of the program on the same data results in the same sequence of operations. Processes communicate with each other by performing operations on communication objects. An object O is defined by a pair (V, OP), where V is the set of all possible values for the object, i.e., its domain, and OP is the set of operations that can be performed on the object. Examples of communication objects include a) shared variables, b) semaphores, and c) FIFO buffers. Operations on communication objects are "visible operations," while other operations are "invisible". The set of visible operations includes at least those operations related to communication between the processes. The set of visible operations may also include a) assertions and b) a special operation $VS_{13}$toss, which expresses nondeterminism.

The execution of an operation is "blocking" if its execution cannot be completed. It is assumed that only operations on communication objects may be blocking.

A "process transition", or "transition" for short, is a visible operation followed by a sequence of invisible operations that is performed by a single process. T denotes the set of all transitions of the system.

A transition whose visible operation is blocking in a global state s is "disabled" in s. Otherwise, the transition is "enabled" in s. A transition t that is enabled in a global state s can be executed from s. If the number of invisible operations in t is infinite, the execution of t from s never terminates. Otherwise, once the execution of t from s is completed, the system reaches a global state s', namely the successor of s by t. Operations on objects, and hence transitions, are deterministic so that the execution of a transition t in a state s leads to a unique successor state.

$$s \xrightarrow{t} s'$$

means that the execution of the transition t leads from the state s to the state s', while $$s \xRightarrow{w} s'$$

means that the execution of the finite sequence of transitions w leads from s to s'. If $$s \xRightarrow{w} s',$$

s' is "reachable" from s.

A concurrent system as defined herein is a closed system: from its initial global state, it can evolve and change its state by executing enabled transitions. Therefore, a natural way to describe the possible behaviors of such a system is to consider its set of reachable global states and the transitions that are possible between these.

Specifically, the joint global behavior of all processes $P_i$ in a concurrent system can be represented by a transition system $A_G=(S, \Delta, s_0)$, S is the set of global states of the system, $\Delta \subseteq S \times S$ is the transition relation defined as follows:

$$(s, s') \in \Delta \mathit{iff} \exists t \in T : s \xrightarrow{t} s',$$

where $s_0$ is the initial global state of the system.

An element of $\Delta$ corresponds to the execution of a single transition t∈T of the system. The elements of $\Delta$ are referred to as global transitions. It is natural to restrict $A_G$ to its global states and transitions that are reachable from $s_0$, since the other global states and transitions play no role in the behavior of the system. Hereinbelow, a "state in $A_G$" denotes a state that is reachable from $s_0$. By definition, states in $A_G$ are global. $A_G$ is called the global state space of the system.

An exemplary concurrent C program is shown in Table 1. This program represents a concurrent system composed of two processes. The two processes communicate by executing the visible operations semwait and semsignal on two semaphores that are identified by the integers 1 and 2, respectively. The value of both semaphores is initialized to 1 by the operation semsetval. By implementing these operations using actual UNIX semaphores, the program of Table 1 can be compiled and run on any computer running UNIX.

TABLE 1

Example of Concurrent System

```
#include <stdio.h>
#include <sys/types.h>
#include <sys/ipc.h>
#include <sys/sem.h>
#define N 2
Process_10
{
    semsignal(1);
    semwait(1);
    semwait(2);
```

TABLE 1-continued

Example of Concurrent System

```
    exit(0)
}
Process_20
{
    semsignal(2);
    semwait(2);
    semwait(1);
    exit(0)
}
main()
{
    int semid, i, pid;
    semid = semget(IPC_PRIVATE,N,0600);
    for(i=0;i<N;i++)
        semsetval(i+1,1);
    if((pid=fork()) == 0)
        Process_10;
    Process_20;
}
```

The state space $A_G$ of this system is shown in FIG. 1, where global transitions are labeled with the visible operation of the corresponding process transition. The entire state space includes both those transitions represented with solid lines and with dashed lines. Since all the processes are deterministic, nondeterminism in $A_G$ is caused only by concurrency.

With closed concurrent systems, the environment of one process is formed by the other processes in the system. This implies that, in the case of a single "open" reactive system, the environment in which this system operates has to be represented, and such representation may require using other processes. In practice, a complete representation of such an environment may not be available, or may be very complex. It is then convenient to use a model, i.e., a simplified representation, of the environment to simulate its external behavior. For this purpose, we introduce a special operation "$VS_{13}$toss" to express a valuable feature of modeling languages, not found in programming languages: nondeterminism. This operation takes as argument a positive integer n, and returns an integer in [0,n]. The operation is visible and nondeterministic: the execution of a transition starting with $VS_{13}$toss(n) may yield up to n+1 different successor states, corresponding to different values returned by $VS_{13}$toss.

It is possible to check certain properties of a concurrent system by examining its state space, $A_G$, as defined above. For example, 1) terminating states, also called deadlocks, and 2) violations of assertions specified by the user with the special operation "$VS_{13}$assert", may be detected. This operation can be inserted in the code of any process, and is considered visible. It takes as its argument a Boolean expression that can test and compare the value of variables and data structures accessible to the process. When $VS_{13}$assert(condition) is executed, the condition is evaluated. If the result is false, the assertion is said to be "violated".

According to a theorem which states that in a concurrent system as defined above, for which $A_G$ denotes its state space, 1) all the terminating states in the system that are reachable from the initial state so are global states, and are therefore in $A_G$, result in deadlocks and 2) assertion violations can be detected by exploring only the global states of a concurrent system. Moreover, if there exists a state reachable from so where an assertion is violated, then there exists a global state in $A_G$ where the same assertion is violated. Thus, the "dynamic" semantics described herein are justified.

When dealing with processes described by arbitrary programs written in full-fledged programming languages, the state of each process is determined by the values of all the memory locations that can be accessed by the process and can influence its behavior. This includes activation records associated with procedure calls. Such information is typically far too large and complex to be efficiently and unambiguously encoded by a string of bits, which could then be saved in memory at each step of the state-space exploration, as required by prior art systems.

However, as is well known, a systematic search of the state space of a concurrent system may be performed without storing any intermediate states in memory. Such a search is a so-called "state-less" search. Of course, if the state space $A_G$ contains cycles, a state-less search through it will not terminate, even if $A_G$ is finite. However, even state-less searches of "small" acyclic state spaces, e.g., composed of only a few thousand states, may not terminate in a reasonable amount of time.

Those of ordinary skill in the art will recognize that state-less searching can be viewed as a particular case of state-space caching, a memory management technique for storing the states encountered during a classical search performed in depth-first order. State-space caching consists of storing all the states of the current explored path plus as many other states as possible given the remaining amount of available memory. It thus creates a restricted cache of selected states that have already been visited. This method never tries to store more states than possible in the cache. A state-less search corresponds to the extreme case where the cache does not contain any state at all.

State-space caching suffers the same drawback as the state-less search, namely, multiple redundant explorations of large unstored parts of the state space yield an unacceptably long run-time. Indeed, almost all states in the state space of concurrent systems are typically reached several times during the search. There are two causes for this. First, from the initial state, the exploration of any interleaving of a single finite partial ordering of transitions of the system always leads to the same state. This state will thus be visited several times because of these interleavings. Second from the initial state, explorations of different finite partial orderings of transitions may lead to the same state.

It is known that most of the effects of the first cause given above can be avoided when using a search algorithm based on the notion of sleep sets. Such an algorithm dynamically prunes the state space of a concurrent system without incurring the risk of any incompleteness in the verification results. Empirical results show that, in many cases, most of the states are visited only once during a state-space exploration performed with this search technique. This makes it possible not to store most of the states previously visited during the search without incurring much redundant exploration of parts of the state space.

Sleep sets belong to a broader family of algorithms, referred to as partial-order methods, which were developed to address the "state explosion" phenomenon that limits the efficiency and applicability of verification by state-space exploration. In accordance with the principles of the invention, state-space exploration is carried out by combining a state-less search with persistent-set and sleep-set techniques. Advantageously, these techniques together simultaneously preserve the beneficial properties of sleep sets described hereinabove while substantially reducing the number of states and transitions that have to be visited.

In accordance with the principles of the invention, state-space exploration is carried out by combining a state-less search with persistent-set and sleep-set techniques. Before turning to the presentation of this process, some basic principles of partial-order methods are reviewed.

The basic idea behind partial-order methods that enables them to check properties of $A_G$ without constructing the whole of $A_G$ is the following: $A_G$ contains many paths that correspond simply to different execution orders of the same process transitions. If these transitions are "independent", for instance because they are executed by processes that do not interact, then changing their order will not modify their combined effect.

This notion of independence between transitions and its complementary notion, the notion of dependency, can be formalized by the following definition. Let T be the set of system transitions, and $D \subseteq T \times T$ be a binary, reflexive, and symmetric relation. The relation D is a valid dependency relation for the system if, and only if, for all $t_1, t_2 \in T$, $(t_1, t_2) \notin D$ ($t_1$, and $t_2$ are independent) implies that the two following properties hold for all global states s in the global state space $A_G$ of the system:

1. if $t_1$, is enabled in s and $$s \xrightarrow{t_1} s',$$

then $t_2$ is enabled in S if $t_2$ is enabled in s' (independent transitions can neither disable nor enable each other); and 2. if $t_1$ and $t_2$ are enabled in s, then there is a unique state s' such that $$s \xRightarrow{t_1 t_2} s'$$

and $$s \xRightarrow{t_1 t_2} s' \text{ (commutativity of enabled independent transitions)}.$$

This definition characterizes the properties of possible "valid" dependency relations for the transitions of a given system.

In practice, it is possible to give easily checkable syntactic conditions that are sufficient for transitions to be independent. In a concurrent system, dependency can arise between transitions of different processes that refer to the same communication objects. For instance, two wait operations on a binary semaphore are dependent when they are enabled, while two signal operations on the same non-binary semaphore are independent. Carefully tracking dependencies between operations on communication objects is by no means a trivial task. Note that *Partial-Order Methods for the Verification of Concurrent Systems—An Approach to the State-Explosion Problem*, volume 1032 of *Lecture Notes in Computer Science*, Springer-Verlag, January 1996, which is incorporated herein by reference, contains a detailed presentation of that topic.

All partial-order algorithms follow the same basic pattern: they operate as classical state-space searches except that, at each state s reached during the search, they compute a subset T of the set of transitions enabled at s, and explore only the transitions in T. The other enabled transitions are not explored. Such a search is called a "selective search". It is easy to see that a selective search through $A_G$ only reaches a subset of the states and transitions of $A_G$, and that subset is not necessarily proper.

Two main techniques for computing such sets T have are known in the art: the persistent-set and sleep-set techniques.

The first technique actually corresponds to a whole family of procedures which is shown, in *Partial-Order Methods for the Verification of Concurrent Systems—An Approach to the State-Explosion Problem* to compute "persistent sets". Intuitively, a subset T of the set of transitions enabled in a state s of $A_G$ is called persistent in s if all transitions not in T that are enabled in s, or in a state reachable from s through transitions not in T, are independent with all transitions in T. In other words, whatever one does from s, while remaining outside of T, does not interact with or affect T. Formally, this translates to the following definition: A set T of transitions enabled in a state s is persistent in s iff, for all nonempty sequences of transitions $$s = s_1 \xrightarrow{t1} s\_2 \xrightarrow{t2} s\_3 \ldots \xrightarrow{tn-1} s_n \xrightarrow{tn} s_{n+1}$$

from s in $A_G$ and including only transitions $t_i \notin T$, $1 \leq i \leq n$, $t_n$, is independent with all transitions in T. Note that the set of all enabled transitions in a state s is trivially persistent since nothing is reachable from s by transitions that are not in this set. See *Partial-Order Methods for the Verification of Concurrent Systems—An Approach to the State-Explosion Problem*, for several such techniques for computing persistent sets and a comparison of their complexity.

A second technique for computing the set of transitions T to consider in a selective search is the sleep set technique disclosed in *Using Partial Orders To Improve Automatic Verification Methods*, published in *Proc. 2nd Workshop on Computer Aided Verification*, volume 531 *of Lecture Notes in Computer Science*, pages 176–185, Rutgers, June 1990, Springer-Verlag and *Using Partial Orders For The Efficient Verification Of Deadlock Freedom And Safety Properties*, published in *Formal Methods in System Design*, 2(2) :149–164, April 1993, which are both incorporated herein by reference. This technique does not exploit information about the static structure of the program, but rather about the past of the search. Used in conjunction with a persistent set algorithm, sleep sets can further reduce the number of explored states.

TABLE 2

| | |
|---|---|
| 1 | Initialize: Stack is empty; |
| 2 | Search0 { |
| 3 |     DFS(Ø); |
| 4 | } |
| 5 | DFS(set: Sleep) { |
| 6 |     T = Persistent_Set()\Sleep; |
| 7 |     while T ≠ Ø do { |
| 8 |         take t out of T; |
| 9 |         push (t) onto Stack; |
| 10 |         Execute(t); |
| 11 |         DFS({ t' ∈Sleep\|t' and t are independent}) |
| 12 |         pop t from Stack; |
| 13 |         Undo(t); |
| 14 |         Sleep=Sleep ∪ {t}; |
| 15 |     }; |
| 16 | } |

Figure 2:
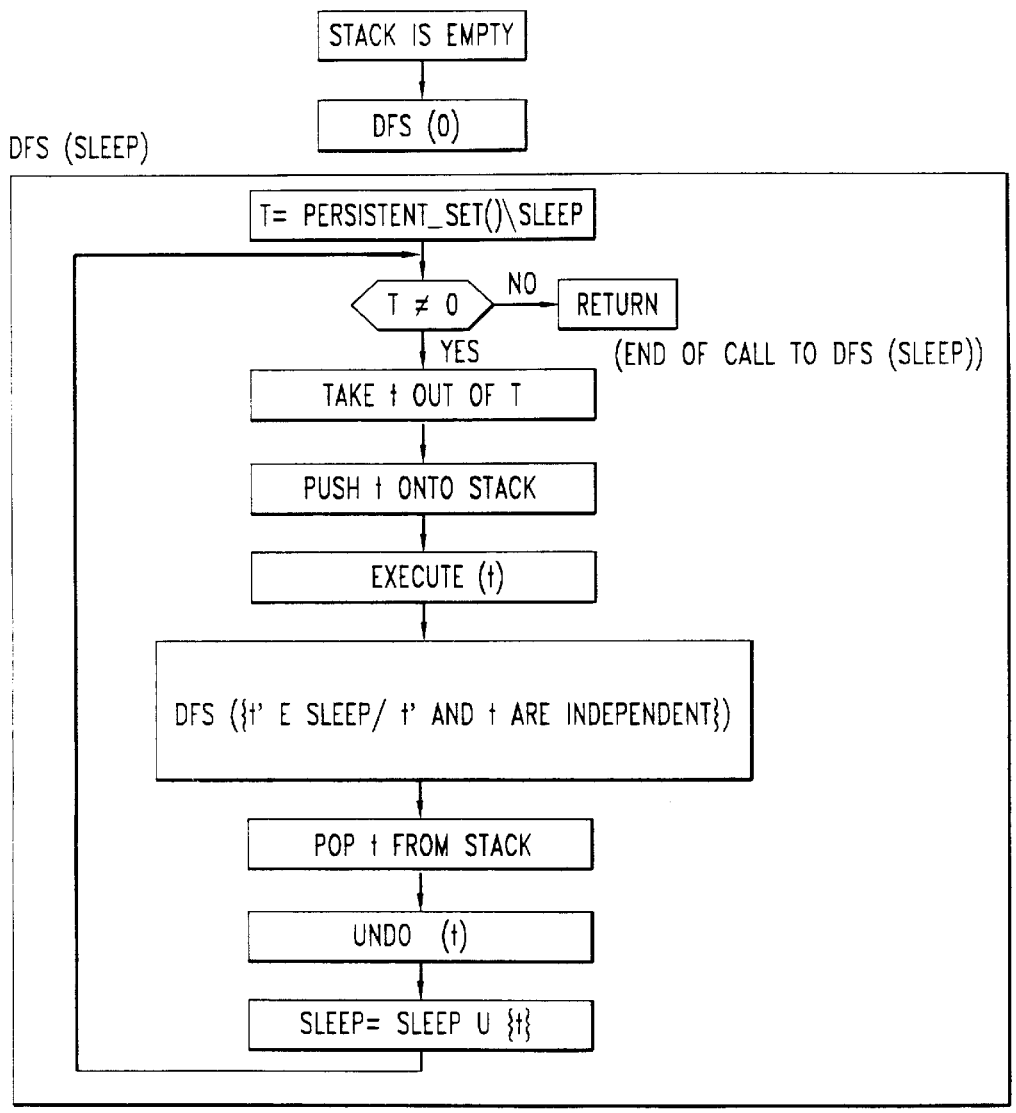
FIG. 2 shows a flowchart representation of a process that combines persistent sets and sleep sets with a state-less search, in accordance with the principles of the invention.

A process that combines persistent sets and sleep sets with a state-less search, in accordance with the principles of the invention, is shown in Table 2. Also, a flowchart representation of the process is shown in FIG. 2. This process performs a selective depth-first search (DFS) in the state space of a concurrent system. The data structure Stack contains the sequence of transitions that leads from the initial state $s_0$ to the current state being explored. A set denoted by Sleep is associated with each state reached during the search, i.e., with each call to the procedure DFS. The sleep set associated with a state s is a set of transitions that are enabled in s but will not be explored from s. The sleep set associated with the initial state $s_0$ is the empty set. Each time a new state s is encountered during the search, a call to DFS is executed. The sleep set that has to be associated with s is passed as an argument.

In accordance with an aspect of the invention, in line 6, a new set of transitions is selected to be explored from s. In particular, $Persistent_{13}Set(\ )$ returns a persistent set in the current state s and then any transitions that are in the sleep set and are also in the persistent set are removed from the persistent set. In line 10, a transition t is executed from s. The procedure Execute(t) returns after a new global state has been reached by the concurrent system. Lines 11 and 14 describe how to compute the sleep sets associated with the successor states of s from the value of its sleep set Sleep. In particular, in line 11 a recursive call to DFS is performed, using as argument the set of transitions that are in the current sleep set Sleep and that are independent with respect to t, which is the transition that was previously executed in line 10 at the current level of recursion. Once the search from that new state, and hence the corresponding call to DFS, is completed, the exploration of the other transitions selected to be explored from state s may proceed. The concurrent system is then brought back to state s in line 13 by the Undo function. This can be done, for example, by reinitializing the system and executing again the sequence of transitions in Stack. Next, transition t, i.e., the last transition explored from s, is added to Sleep in line 14.

The correctness of Process 2 is established by the theorem that, for a concurrent system as defined in Section 2, having state space $A_G$ if $A_G$ is finite and acyclic, then all the deadlocks of $A_G$ are visited by Process 2. Moreover, if there exists a state in $A_G$ where an assertion is violated, then there exists a state visited by Process 2 where the same assertion is violated. In other words, deadlocks and assertion violations can be detected using Process 2. Of course, as previously discussed, this result only holds when the state space $A_G$ does not contain cycles. However, Process 2 can be very useful for analyzing systems that do not satisfy this assumption, as described hereinbelow.

Finally note that Process 2 is different from the algorithms combining persistent sets and sleep sets that appeared in *Partial-Order Methods for the Verification of Concurrent Systems—An Approach to the State-Explosion Problem*. Indeed, with a state-less search, different sleep sets associated with the same global state (corresponding to different visits of that state via different paths from $s_0$) cannot interfere with each other during the search. Moreover, cycles cannot be detected in the context of a state-less search, which makes impossible the use of the provisos discussed in *Partial-Order Methods for the Verification of Concurrent Systems—An Approach to the State-Explosion Problem*.

Figure 3:
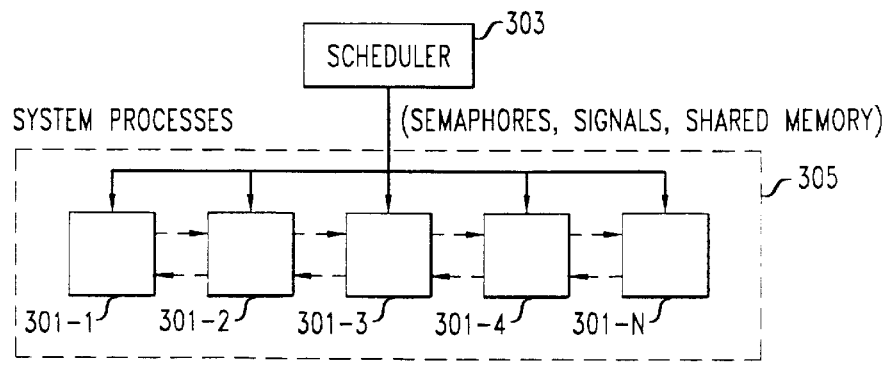
FIG. 3 shows the architecture for a system for implementing a state-less search using persistent sets and sleep sets in a tool for systematically exploring the state space of systems composed of several concurrent processes executing arbitrary C code, in accordance with the principles of the invention.

The state-less search using persistent sets and sleep sets may be implemented in a tool for systematically exploring the state space of systems composed of several concurrent processes executing arbitrary C code. The architecture for the resulting system is shown in FIG. 3. For analysis purposes, every process 301, which includes processes 301-1 to 301-N, of concurrent system 305 to be analyzed, which when actually executed may be executing on different machines, may be mapped to a respective UNIX processes in a single machine. Communication between the processes is simulated by passing messages between the processes. The executions of all processes 301 are controlled by an external process, scheduler process 303. Scheduler process 303 observes the visible operations performed by processes 301 inside concurrent system 305, and can suspend or resume their execution. By resuming execution of a selected one of processes 301 in a global state, scheduler process 303 can explore one transition in the state space $A_G$ of concurrent system 305. Indeed, the code for all processes 301 is instrumented automatically in such a way that, whenever one of processes 301 attempts to execute a visible operation, it signals scheduler process 303, and then suspends its execution.

Scheduler process 303 also contains an implementation of a search such as Process 2. In order to prevent the state-less search from getting lost in cycles of the state space being explored, the depth of the search is limited. When a deadlock or an assertion violation is detected, the search is stopped, and a scenario formed by all the transitions currently stored in Stack is displayed to the user. Those of ordinary skill in the art will be able to implement a graphical simulator, with guided/interactive modes, for following the execution of the processes of the system.

In addition to deadlocks and assertion violations, the system also checks for "divergences" and "livelocks". A "divergence" occurs when a process does not attempt to execute any visible operation for more than a given, e.g., user-specified, amount of time, while a "livelock" occurs when a process has no enabled transition during a sequence of more than a given, e.g., user-specified, number of successive global states. Note that these definitions of divergence and livelock differ from the standard definitions for these notions, which corresponds to liveness properties, i.e., properties that can only be violated by infinite sequences of operations or transitions. In contrast, the above-defined notions of divergence and livelock can be violated by finite sequences of operations or transitions, and therefore are actually safety properties. Indeed, a state-less search cannot detect cycles, and is thus restricted to the verification of safety properties.

In an exemplary embodiment of the invention, initially, the scheduler process creates all the system processes, and waits until all these processes are ready to perform their first visible operation. When this happens, the system is then in its "initial global state". As noted, a concurrent system is in a "global state" when the next operation to be executed by every process in the system is a visible operation. Initially, after the creation of all the processes of the system, it is assumed that the system may reach a first and unique global state so, called the initial global state of the system. Then, the scheduler process starts executing Process 2.

The following describes how to implement the two basic procedures, "Execute(t)" and "Undo(t)", of Process 2. Note that the other steps in Process 2 employ conventional operations.

The procedure "Execute(t)" executes one transition t selected to be explored by the search algorithm. Let P(t) be the process that contains transition t. When a call to "Execute(t)" is performed, the scheduler process signals the process P(t) to proceed. Next, the scheduler process waits until process P(t) has reached its next visible operation. Process P(t) is woken up by the signal sent by the scheduler process, and it continues its execution. When it attempts to execute its next visible operation, process P(t) signals the scheduler process, and suspends its execution. This signal wakes up the scheduler process, and the call to the procedure "Execute(t)" is completed. The concurrent system is now in a new global state.

The procedure "Undo(t)" brings the system back in the global state where it was before the execution of transition t. When a call to "Undo(t)" is performed, all the system processes are killed and the resources that they use for communicating with each other are freed. Then, the system is reinitialized as described above. Next, all the transitions currently stored in the data structure "Stack" of Process 2 are successively executed, starting from the transition at the bottom of the stack, up to the transition at the top of the stack. The execution of each of these transitions t is performed by calling "Execute(t)", as described above.

Consider a simple example of a communication protocol composed of two processes P1 and P2 as described in the FIG. 1. These two processes communicate by performing operations on binary semaphores. Note, as is well known, that the value of a binary semaphore is either 0 or 1. If the value of a binary semaphore s is 0, executing a semsignal operation on s sets the value of s to 1. If the value of a binary semaphore s is 1, semwait operations on the semaphore is enabled (non-blocking), and executing a semwait operation resets the value of s to 0. If the value of a binary semaphore s is 0, semwait operations on the semaphore are disabled (blocking). It is known that two semwait operations on a same semaphore are dependent, while two operations on different semaphores are independent.

As shown in FIG. 1, the first process first performs a "semsignal" operation on a semaphore identified by the integer "1", then performs a semwait operation on the same semaphore identified by the integer "1", then performs a semwait operation on another semaphore identified by the integer "2", and then stops. The second process has a similar behavior.

The state space explored when using persistent-set and sleep-set techniques is depicted in the bottom part of FIG. 1. This reduced state space is a graph whose nodes corresponds to global states of the system (protocol) and edges corresponds to the execution of an operation by one of the processes. In FIG. 1, dashed transitions, and the states reachable by dashed transitions only, are NOT visited during a state space exploration performed using the persistent sets and sleep sets techniques of the invention, e.g., by using Process 2.

Assume that the initial state of the system is the state (0,0), shown at the top of the graph. The sleep set associated with the initial state is the empty set. In that state, two transitions are enabled: P1:semsignal(1) and P2:semsignal(2). The first transition P1:semsignal(1) is a persistent set in state (0,0). Note that several algorithms for computing persistent sets are presented in *Partial-Order Methods for the Verification of Concurrent Systems—An Approach to the State-Explosion Problem.*

Therefore, Process 2 needs only to explore the transition P1:semsignal(1) from the initial state. After the execution of this transition, a new state (1,0) is reached. The sleep set for this new state is empty. Hereinafter, for clarity and simplification purposes the value of the sleep set for states where this value is the empty set is not explicitly mentioned. In other words, unless otherwise specified, the value of the sleep set with each state is the empty set. In state (1,0), there are two enabled transitions: P1:semwait(1) and P2:semsignal(2). The second transition P2:semsignal(2) is a persistent set in state (1,0). Hence, Process 2 only explores it from that state, and reaches a new state (1,1). In state (1,1), the only persistent set is the set of all enabled transitions, i.e., P1:semwait(1) and P2:semwait(2). Consequently, Process 2 has to explore both transitions, and hence reaches two new states (2,1) and (1,2).

From state (2,1), Process 2 has to select again both enabled transitions and reaches the states (3,1) and (2,2). In these two states, there are no enabled transitions as these states are deadlocks, and the search from these states stops.

In state (1,2), the sleep set associated with that state contains transition P1:semwait(1). Indeed, it is independent of transition P2:semwait(2). In state (1,2), the only persistent set is again the set of all the enabled transitions, i.e., P1:semwait(1) and P2:semwait(1). However, since the first of these two transitions is in the current sleep set, it is not explored. Hence, only the second transition P2:semwait(1) is explored. After the execution of this transition, state (1,3) is reached. In that state, there are no enabled transitions, so the state is a deadlock, and the search stops.

This example illustrates the effect of using persistent sets and sleep sets. At the end of the search, one can observe that all deadlock states, i.e., states (3,1), (2,2), and (1,3), have been explored by Process 2, as predicted. Moreover, for this example, Process 2 avoids the exploration of 7 dotted transitions and 3 states. Finally, all the states visited by Process 2 are actually visited exactly once by this algorithm.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method for use in verification of the protocol between the various comunicating elements of a concurrent system, said communicating elements being defined by executable code, the method comprising the step of:

exercising the executable code of said concurrent system to visit a selected subset of all global states of the concurrent system sufficient to verify the existence or absence of user selected problems that might exist in the protocol without using an explicit representation of said global states.

2. The invention as defined in claim 1 wherein said exercising step further includes the step of selecting said global states to be visited using a persistent set for each visited global state.

3. The invention as defined in claim 1 wherein said exercising step further includes the step of selecting said global states to be visited using a sleep set for each visited global state.

4. The invention as defined in claim 1 wherein said exercising step further includes the step of selecting said global states to be visited from a particular global state by visiting only the successor states of said particular global state which are defined by the transitions in a persistent set for said particular global state.

5. The invention as defined in claim 1 wherein said exercising step further includes the step of selecting said global states to be visited from a particular global state by visiting only the successor states of said particular global state which are defined by the transitions not in a sleep set for said particular global state.

6. The invention as defined in claim 1 wherein said exercising step is performed using a depth first search.

7. The invention as defined in claim 6 wherein said depth first search is performed recursively.

8. The invention as defined in claim 1 wherein said exercising step further includes the steps of:

selecting said global states to be visited using a persistent set for each visited global state;

selecting said global states to be visited using a sleep set for each visited global state; and removing from the persistent set any transitions that are in said sleep set and are also in said persistent set.

9. A method for use in verification of the protocol between the various communicating elements of a concurrent system, said communicating elements being defined by executable code, the method comprising the step of:

exercising the executable code of said concurrent system to visit a selected subset of all global states of the concurrent system sufficient to verify the existence or absence of user selected problems that might exist in the protocol, said subset being selected via a stateless search.

10. A method for use in verification of the protocol between the various communicating elements of a concurrent system, said communicating elements being defined by executable code, wherein a set of transitions to explore from any state is developed by the method comprising the steps of:

determining a persistent set in the current state s;

determining a sleep set in the current state s; and removing from the persistent set any transitions that are in a sleep set and are also in the persistent set.

11. The invention as defined in claim 10 wherein said method is performed recursively upon each transition in said set of transitions.

12. The invention as defined in claim 10 wherein said method further comprises the steps of:

executing a transition t from s; and waiting until a new global state has been reached by the concurrent system.

13. The invention as defined in claim 12 further comprising the steps of:

restoring the concurrent system to state s and executing, again the sequence of transitions in Stack; and adding the last transition explored from s to Sleep.

14. A method for use in verification of the protocol between the various communicating elements of a concurrent system, said communicating elements being defined by executable code and being mapped to processes executable on a single computer so that messages can be passed between said communicating elements, the method comprising the steps of:

initiating execution by each of said communicating elements;

suspending execution by each of said communicating elements just prior to executing a visible operation, until all of said communicating elements are suspended just prior to executing a visible operation whereby said system is in a current global state; and executing a depth first search to visit further selected one of all global states of the concurrent system, wherein said further global states to be visited are successor states of said current global state and are defined as a function of transitions in a persistent set for said current global state and not in a sleep set for said current global state.

15. Apparatus for use in verification of the protocol between the various communicating elements of a concurrent system, said communicating elements being defined by executable code and being mapped to executable processes so that messages can be passed between said communicating elements, the method comprising:

an execution control regulator which initiates execution of each of said communicating elements and suspends execution by each of said communicating elements just prior to executing a visible operation, until all of said communicating elements are suspended just prior to executing a visible operation whereby said system is in a current global state; and a search control engine for causing the concurrent system to visit further selected ones of all global states in accordance with a depth first search wherein said further global states to be visited are successor states of said current global state and are defined as a function of transitions in a persistent set for said current global state and not in a sleep set for said current global state.

16. Apparatus for use in verification of the protocol between the various communicating elements of a concurrent system, said communicating elements being defined by executable code, wherein said apparatus develops a set of transitions to explore from any state, said apparatus comprising:

means for determining a persistent set in the current state;

means for determining a sleep set in the current state; and means for removing from said persistent step any transitions that are in said sleep set.

17. Apparatus for use in verification of the protocol between the various communicating elements of a concurrent system, said communicating elements being defined by executable code and being mapped to processes executable on a single computer so that messages can be passed between said communicating elements, the apparatus comprising:

means for initiating execution by each of said communicating elements;

means for suspending execution by each of said communicating elements just prior to executing a visible operation, until all of said communicating elements are suspended just prior to executing a visible operation whereby said system is in a current global state; and means for executing a depth first search to visit further selected ones of all global states of the concurrent system, wherein said further global states to be visited are successor states of said current global state and are defined as a function of transitions in a persistent set for said current global state and not in a sleep set for said current global state.

18. Apparatus for use in verification of the protocol between the various communicating elements of a concurrent system, said communicating elements being defined by executable code and being mapped to processes by which messages can be passed between said communicating elements, the apparatus comprising:

means for controlling initiation and cessation of execution of each of said communicating elements of the concurrent system to visit a subset of all global states of the concurrent system sufficient to verify the existence or absence of one or more user selected problems that might exist in the protocol without using an explicit representation of said global states; and means for initiating signaling of existence of said one or more of said user selected problems upon detection of one or more of said user selected problems.

19. A media for storing computer code for use in verification of the protocol between the various communicating elements of a concurrent system, said communicating elements being defined by other executable computer code, the computer code stored in said media for use in verification being for performing a method comprising the step of:

exercising the executable code of said concurrent system to visit a selected subset of all global states of the concurrent system sufficient to verify the existence or absence of user selected problems that might exist in the protocol without using an explicit representation of said global states.

* * * * *